United States Patent Office 3,271,765
Patented Sept. 6, 1966

3,271,765
DATA COMPRESSION PROCESSING SYSTEM
Samuel R. Pulford, Owego, N.Y., assignor to International Business Machines Corporation, New York, N.Y., a corporation of New York
Filed Dec. 19, 1963, Ser. No. 331,732
9 Claims. (Cl. 343—12)

The present invention relates broadly to electric signal data processing systems, and, more particularly, to such systems effecting data compression of electric signal information.

Determination of range, bearing and relative velocity of a target with respect to an observation point by measuring the echo transit time and frequency shift of an electromagnetic signal directed from the observation point to the target are well-known techniques. Considering the determinations as separate and non-interacting, the to-and-from transit time of the signal moving at a known rate fixes range; change in frequency of the return or received signal over the transmitted signal indicates relative velocity (Doppler shift); and bearing is obtained by noting angle of maximum return signal since, other conditions being equal, maximum return-signal is obtained when the antenna is aimed directly at the target.

It is now standard practice to provide apparatus for sending and receiving such radar signals to view the terrain from the side of, say, a moving aircraft and provide a continuous record of range and bearing, in particular, of targets located at substantially ninety degrees to the flight path of the aircraft. Processing of the signal returns provides a rather complete picture of the terrain which can be used immediately or stored for later consideration. It is clear, of course, that such signals are available in large quantities on a real time basis and that satisfactory processing apparatus must have an adequately large handling capacity and high processing rate.

Additional complications are encountered with side-looking radar systems, as these are frequently termed, mainly due to the fact that the interrogating beams are only ideally dimensionless and in actuality are tear-shaped with the lobed end extending away from the aircraft. As the craft moves past a target the beam sweeps by or past the target and different frequency shifts are obtained during contact as well as different lengths of contact depending on the range of a given target. Practically, this means that information reply signals are in a form requiring processing apparatus that can compensate for these factors to insure obtaining and storing of a substantially distortion free representation.

A fundamental object of the invention is the provision of a data processing system which effects compression of the information being processed.

It is a further contemplation here to provide a data processing system for receiving and interpreting signal information provided by a side-looking radar into terms of range of interrogated targets.

Another and primary object of the invention is to provide a system for processing Doppler return signals from various targets located at different ranges.

A further object is the provision of such a system in which simultaneous processing and storage of Doppler radar return signals from various targets of differing range and bearing is effected.

Still another object of the invention is the furnishing of a system described in the above objects in which a single identification signal pulse is obtained representative of the full information relative to an interrogation sweep of a given target.

Another object is the provision of a data compression processing system as above in which each identification signal pulse is the cumulative result of a plurality of return signals obtained throughout a single interrogation sweep of an associated target.

Yet another object is the provision of a system as in the above objects wherein a matched filter is utilized to receive multiple return signals and render corresponding sets of identification signal pulses indicative of different azimuth target ranges.

A still further object is the provision of a matched filter data processing system for handling side-looking radar information to within an exceptionally high degree of resolution.

A further object of the invention is to provide a data compression processing system having the characteristics set forth above which is highly simplified in operation and construction.

Briefly, the invention contemplates the coded storing of side-looking radar return signals in a suitable recording medium, where the signals being stored represent the absolute magnitude of the change in frequency associated with the Doppler effect at a particular location of the target in the interrogating beam. Read-out of the stored signals is accomplished at a controlled rate as to establish a constant ratio of Doppler frequency change with respect to time. The signals so set to the fixed predetermined ratio are then passed through a matched filter means of corresponding slope characteristics such that maximum signal passage is obtained for those signals having the set predetermined ratio to time. The signal output of the matched filter is pulselike of maximum value when the rate of read-out is adjusted to provide signals of appropriate slope for the particular matched filter. With a given filter the rate of read-out from the record medium for maximum filter output is a direct function of range to the target being interrogated.

The foregoing and other objects, features and advantages of the invention will be apparent from the following more particular description of a preferred embodiment of the invention, as illustrated in the accompanying drawings.

Figure 1:
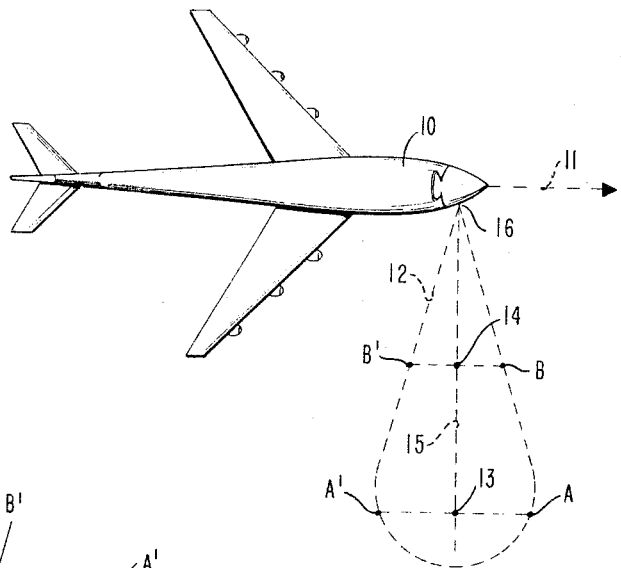
FIGURE 1 is a diagrammatic representation of an aircraft in flight with side-looking radar apparatus in operation.

With reference now particularly to FIGURE 1 there is shown an aircraft 10 traveling along a substantially straight line path 11 relative to ground track in the direction indicated by the arrow. This path coincides for present purposes with what is termed the flight reference vector. The aircraft is equipped with radar apparatus for directing a beam of electromagnetic energy 12 toward the terrain and at an angle of substantially ninety degrees to flight vector of the craft. For the purpose of understanding operation of the invention, the energy lobe 12 is shown in stylized form as generally tear-shaped with increasing transectional dimensions being encountered at greater distances from the craft.

During flight the beam 12 impinges upon the terrain and is reflected back continuously throughout the time of impingement for the purposes already described. The time extent of impingement or contact of a given target point with the interrogating beam 12 is a function of both the range of the target point from the craft and the velocity of the craft. By way of example, considering a target point 13 relatively remote from the craft, it is first contacted by the leading edge of the beam 12 at a point A and interrogation continues until contact is broken at the point A'. Return signals are provided throughout the entire period of time required for the craft to move the distance A–A'.

Similarly for a target point 14 located at a shorter range from the craft, it will first intercept the beam 12 at point B and break contact at B' with return signals provided throughout the time required to traverse the distance B–B'. It is clear that since the distance B–B' is less than A–A' that the time of exposure of point 14 to the beam (and period during which return signals are received) is less than that for the more distant target point 13.

During radar contact with a target as described above a Doppler effect is produced in the return signals due to the change in relative velocity between the target and craft during interrogation. This can be best understood from a consideration of the geometry of FIGURE 1. As the point 13 is swept from A through the mid-position on normal 15 the distance of the target point from the beam source 16 moves from a maximum to a minimum on the normal and then once again increases to a maximum at A'. During this time with the craft velocity along the straight line indicated assumed to be constant there is produced a relative velocity change which is maximum at the points A and A' and linearly decreases to zero at the normal 15.

Figure 2:
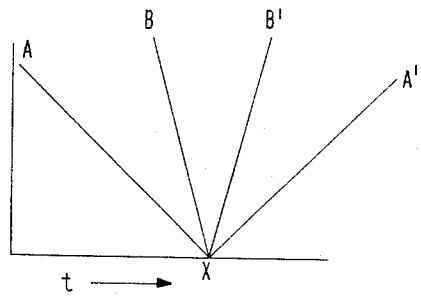
FIGURE 2 is a graph of synchronously detected Doppler return signals relative to time for a pair of targets swept by a side-looking radar lobe as in FIGURE 1.

This relative velocity effect is graphically shown in FIGURE 2, with the ordinate representing absolute change in signal frequency, $|\Delta f|$, and the abscissa indicating time, $t$. For the target point 13 the greatest values of Doppler change are to be found at the extreme points of contact A, A' with a linearly decreasing effect registered for locations between and zero effect noted along the line 15 normal to the flight vector 11 at the source 16. The same general condition is obtained for the closer point 14 except that the time extent between extreme contact points B and B' is less than for the point 13. The graph for an interrogation sweep of each target point is accordingly seen to be of a generally V-shape opening upwardly and symmetrical about a vertical axis.

It is clear from the foregoing that processing apparatus for analyzing such return signal information and effecting determinations as to range of target points on the terrain must be able to accept and process Doppler shift data that may lie on any of a whole spectrum of V-graphs as in FIGURE 2. Or in other words, to properly identify and process return data from a target at a given range it is necessary to determine the rate of change of the absolute value of $\Delta f$ with respect to time for use as a reference for the stored signals. For example, a set of signals obtained from point 13 and improperly identified as pertaining to the graph B–B' of FIGURE 2 would clearly result in an erroneous processing mechanization. And it is a fundamental function of the invention to provide and insure correlation of data signals with their correct associated time rate of change. Or, stated slightly differently, the system must be able to process serially occurring substantially constant-amplitude pulse signals representing relatively long ranges where the phase of the pulses varies as a function of the instantaneous disposition of the generating target point with respect to the normal line 15.

Figure 5:
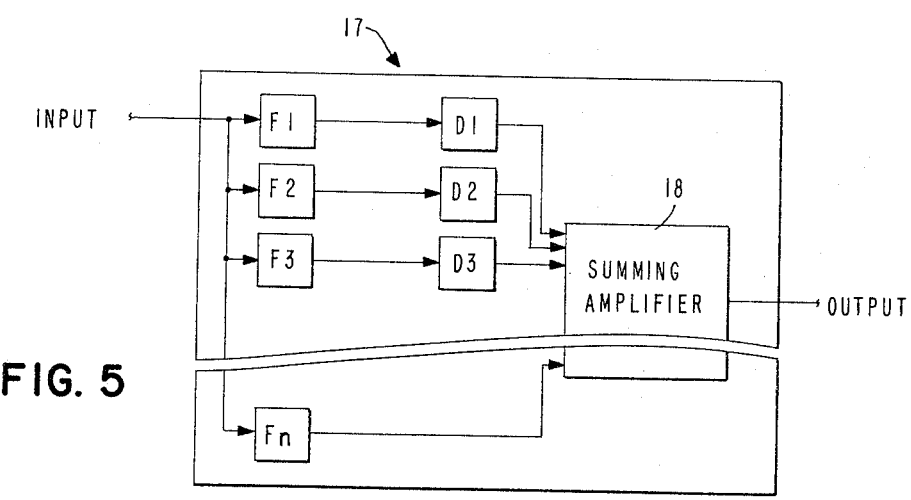
FIGURE 5 is a function block diagram of a matched filter for rendering signal information stored in the forms shown in FIGURES 3 and 4.

An essential component apparatus of the system described here is what can be termed a matched filter, which in the main comprises means for generating an output signal in response to a series of Doppler signals having a given predetermined time slope. One form of such a matched filter, which is more properly termed a channelized matched filter, consists of a plurality of filters of individual predetermined filtering characteristics with a corresponding set of individual delay means, the purpose and coaction of which will be entered into at this time with reference to both FIGURES 2 and 5. Confining attention to merely the left half of graph A–A' (A–X) it is seen this line can be considered as composed of a large number of different frequency elements $\Delta f1$, $\Delta f2$, . . . each separated from its immediate predecessor in time by some increment of time, $\Delta t$. It can be shown that any particular V-graph can be fully defined for present purposes by a corresponding series of $\Delta f$'s of substantially identical bandwidth and associated constant time spacing $\Delta t$.

The channelized matched filter 17 includes a plurality of different filters F1, F2, F3 . . . F$n$ each designed to pass a corresponding $\Delta f$ frequency component and to impede other frequency components. As illustrated, filter F1 will pass component $\Delta f1$, F2 will pass $\Delta f2$, and so forth. Input information signals are impressed in common on each of the filters. With the exception of F$n$, each of the filters is provided with an associated delay at its output, that is, D1–F1, D2–F2, D3–F3, . . . where the delays are composed of whole number amounts of a suitable unit delay $\Delta t$. The individual outputs of the delays are then fed into a summing amplifier 18 for providing, as will be shown, a pulselike signal output.

In explanation of operation of the above matched filter, $\Delta f1$ is the first frequency component received from, say, the point 13 when it is at position A. This signal is readily passed by the filter F1 but blocked by each of the other filters F2, F3, . . . F$n$. The filtered component $\Delta f1$ is then delayed by D1 a sufficient time to bring it into time coincidence with receipt of $\Delta fn$ which is the last frequency component obtained before zero Doppler change (point X in FIGURE 2). Similarly, $\Delta f2$, $\Delta f3$ . . . are fed through their respective filters and delayed individual amounts necessary to effect time coincidence of all such signals with $\Delta fn$, the latter frequency component not requiring delay or only such amount as is necessary for minor synchronization purposes. The cumulative effect of applying the matched series of Doppler return signals represented by the half of the graph A–X to the appropriately constructed filter is the production of a single pulse at the output of the summing amplifier. Other sets of signals from other target points, although perhaps passing components through all the different filters, do not produce a single large pulse because of the fact that the prescribed delays do not provide coincidence of the different filtered components. It is clear therefore that for each matched filter of fixed characteristics there is a single precisely defined series of frequency components having a fixed time slope that is associated therewith. Or considered from a different standpoint, receipt of a series of Doppler signals which on being fed into this matched filter produces a pulse output, indicates that the target point being interrogated is located at the same azimuth as the point 13 which can be of predetermined character.

Although the system as presented here is described as including a channelized matched filter, the invention is not confined to this specific construction alone. Exemplary of alternates in this regard, so-called all-pass networks composed of passive components in a filter configuration are satisfactory, and also dispersive ultrasonic delay lines can be adapted for this purpose.

As will be made clear below in the description of the complete system operation, the invention utilizes a single such matched filter for accommodating Doppler signal information from points of any particular range regardless of its V-graph time slope. This is highly important since to expand the channelized matched filter technique to a large number of targets at a correspondingly large number of different ranges by providing an individual matched filter for each range would be highly impractical. Also, by direct use of many matched filters any attempt to reduce the number of such filters increases the minimum detectable distance between target points, that is, decreases resolution capabilities, which of course is undesirable.

In broadest terms, the system of the invention utilizes a single matched filter for handling multi-range information by presenting the Doppler return information to the matched filter at an appropriate time rate such that maximum signal output therefrom is obtained. The specific time rate necessary to accomplish this is functionally related to the actual range of the target point under interrogation. To illustrate this point, if the different frequency components of curve portion B–X are separated in time sufficiently the straight-line curve portion can be made to approximate the slope of curve portion A–X as closely as desired, and, of course, on achieving this the so changed series of signals associated with the B–X curve portion can be presented to the matched filter designed, by way of example, for signals associated with the A–X curve portion and the desired pulse output obtained.

Figure 7:
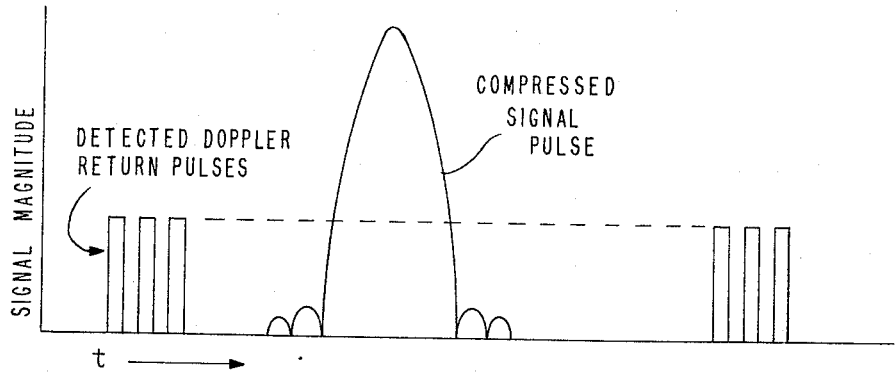
FIGURE 7 is a graphical representation of relative values of certain electrical signals of the system shown in FIGURE 6.

The result achieved and which is required for successful operation of the invention is illustrated by the graph of FIGURE 7. Shown there is a train of detected constant-amplitude Doppler return pulses that are impressed on the input of the matched filter, and the compressed signal available at the output when the series of pulses either have, or are provided with, the essential characteristics for being cumulatively passed therethrough in the manner already set forth.

Figure 3:
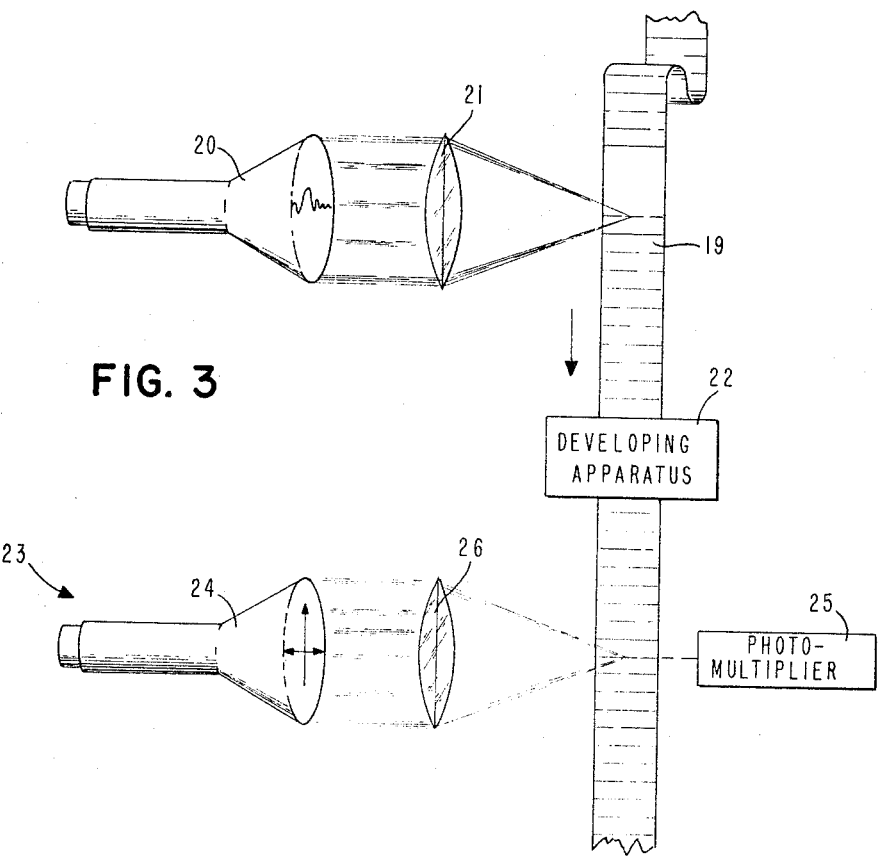
FIGURE 3 is one form of recording and read-out apparatus for practicing the invention.

A further essential element of the system described here is apparatus for effecting appropriate time shift of the different frequency components of signal sets obtained from targets located at various ranges in order to permit their accommodation by a single matched filter. One such apparatus is shown in FIGURE 3. In the main it consists of a strip of photographic film 19 adapted for movement along a definite path. A cathode ray tube 20 and optical means 21 are located adjacent the path of movement of the film for selectively exposing it by the CRT trace. After the film is exposed it is then developed by developing apparatus 22 to provide a semitransparent film recording where the degree of transparency is related to exposure to the trace of the CRT 20.

The film recording is then brought into operative relation with a flying-spot scanner 23, which includes a cathode ray tube 24 mounted adjacent for directing a trace through the developed film onto a photomultiplier 25. The principle of a flying-spot scanner is well known and in essence here contemplates the controlled presentation of a raster on the CRT 24 which via lens system 26 and the film impinges onto the photomultiplier 25 to produce an electric signal representation of the information recorded on the film.

More explicitly, as the film 19 moves past the CRT 20 it is swept transversely by the trace which is merely a line scan the total length of which extends for a distance that is less than the film width. The trace is synchronized with and actuated by the radar apparatus in a way that will be shown such that targets are displayed along this line on the CRT as bright areas with the distance of these areas from a reference end of the scan being functionally related to the range of the associated target. Accordingly the film is exposed a slight amount by the basic trace line and to a greater extent by the bright areas along the trace. Many such exposures are obtained for each target as the interrogation beam sweeps by. After the film is developed it contains an optical record of the radar returns from many targets which takes the form of a train of transparent areas separated by relatively translucent regions for each target point and where the distance of each train from a common reference edge represents range of the associated target.

As illustrated the developed film strip is immediately read-out and processing of the recorded data is begun. It is to be understood, however, that it is contemplated the developed film may be stored for any length of time prior of further data processing.

When the film is operatively related to the flying-spot scanner it is scanned to obtain pulse trains via the photomultiplier corresponding to the relatively transparent areas on the film. The rate of scan is controlled such that signals obtained for the different targets can be presented to a single matched filter to achieve the desired results discussed previously.

The general theoretical aspects of operation and control of both the CRT 20 for selectively exposing the film 19 and the flying-spot scanner 23 are believed to be sufficiently well known in the electronics art that no details need be given other than their overall functional relation and integration with the radar apparatus that will be given later herein.

Although the recording medium used above in an illustrative feature of the invention was a strip of transparent material having a photosensitive layer which on exposure acts as a photographic positive, it is believed that other recording media may also be found to be advantageous. For example, an electrostatic storage tube offers itself as an ideal means for this purpose since it is amenable to direct electrical input and provides an electric signal output such that scan conversion can be accomplished rather simply. Present day cathode ray tubes can also be adapted for such a recording function if the quantity of information to be stored is not excessive. Magnetic tape storage is also particularly attractive in view of its ready incorporation with electronic data processing equipment of all kinds.

Figure 4:
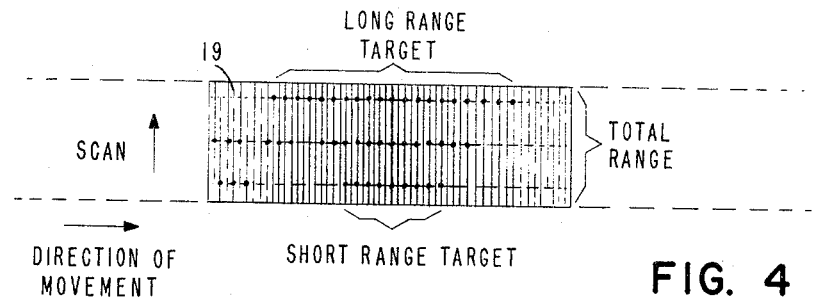
FIGURE 4 is an enlarged, fragmentary, stylized showing of the recording medium utilized by the apparatus illustrated in FIGURE 3.
Figure 6:
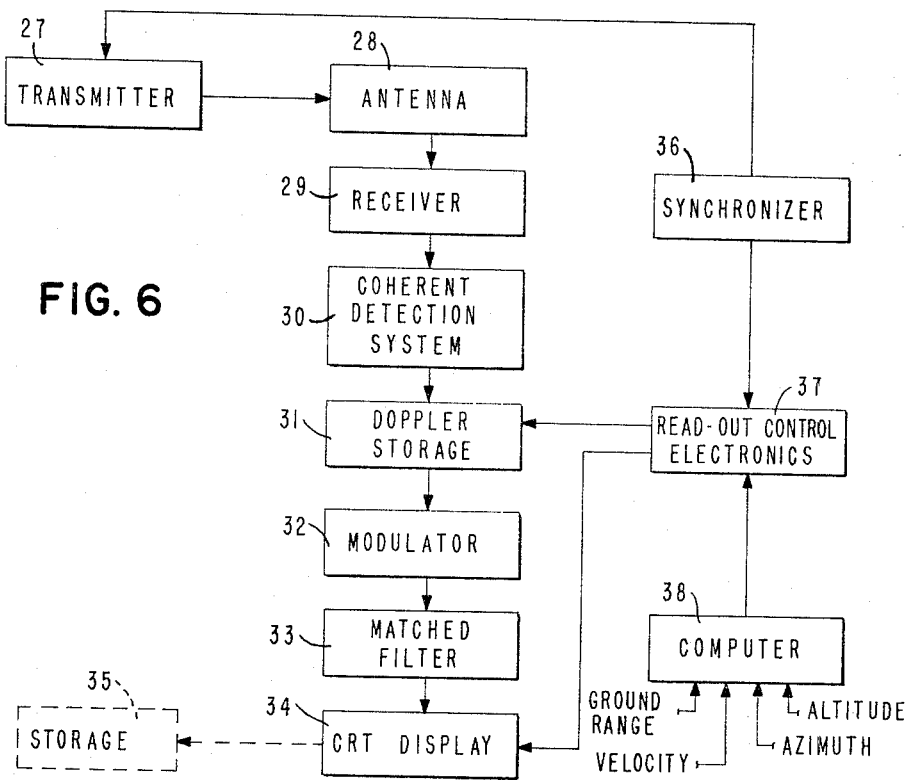
FIGURE 6 is a diagrammatic representation of the system of the invention in functional block in relation to associated radar transmitting and receiving apparatus.

For the ensuing description of system operation reference should be made to FIGURE 6. Radar signals are generated by a suitable transmitter 27 and directed toward the terrain to be interrogated establishing a side-looking pattern as in FIGURE 1. The reflected return signals containing Doppler information are received by an antenna 28 and processed in the usual manner by receiver 29 and detected by a coherent detection system 30, which is frequently considered as an integral part of the receiver. The detected return signals are fed from the system 30 into a Doppler storage 31 of the prescribed type and having the necessary characteristics brought out earlier and illustrated in FIGURES 3 and 4.

Upon read-out from the storage 31 the signal output is transformed by a modulator 32 into a modulated carrier wave which is more amenable to the special filtering action of the matched filter 33. In explanation, the stored information in the Doppler storage 31 consists of signals in the video range on read-out and is impressed on a carrier wave of, say, 30–60 megacycles. A matched filter for handling signal information in this range without sacrificing high resolution is more practically obtainable than one for video signals directly.

The compressed data pulses fed out of the matched filter 33 are shown as applied to a display cathode ray tube 34 for visual examination and interpretation. Sweep control of the CRT 34 by means that will be set forth below serves to identify the different displayed pulses as to their respective ranges. The compressed information as displayed can optionally be stored in a suitable storage 35 as shown in dashed line form.

A synchronizer 36 generates periodic pulses at the work rate of the radar for causing the transmitter 27 to send out radar pulses in a corresponding manner. The same synchronizing pulses are used to coordinate read-out of the Doppler storage 31 via read-out control electronics 37, the latter being under the control of a computer 38.

As noted previously, actual range to the target point is important in determining scan rate for read-out relative to the target point. As a usual matter radar apparatus of the character being used here does not directly provide actual range (i.e., slant range to the target) but rather ground range. Accordingly, input information to the computer is shown as including ground range and altitude from which the required true (slant) range can be calculated. Velocity of the craft is a necessary parameter to account for in order to maintain a constant scale factor.

As described and shown in the drawings, the aiming angle of the radar beam was given as ninety degrees to the craft. This angle can be varied, and, in fact, it is of advantage to emit the radar beam somewhat in a forward direction. Variation of this angle can probably be successfully effected in the forward direction up to approximately twenty degrees off the straight-ahead condition at the present time. It is with cognizance of this capability that the computer is provided with azimuth angle information.

For those desiring further details and a discussion of the theoretical aspects of radar transmitters and receivers reference should be made to chapters 11 and 7, respectively, of the text "Airborne Radar," by Povejsil, Raven and Waterman, D. Van Nostrand Company, Inc., New York, 1961. A satisfactory transmitting and receiving system with which the invention can be practiced is set forth in diagrammatic form on page 602 of this book.

A detection system for performing the function of the system 30 is that illustrated in FIGURES 25–27, page 1010 of the textbook "Electronic and Radio Engineering" by Frederick E. Terman, McGraw-Hill Book Company, Inc., New York, 1955.

For those wishing a more detailed exposition of radar techniques particularly as applied to side-looking utilization, reference should be made to the article entitled, "A Comparison of Techniques for Achieving Fine Azimuth Resolution" by L. Cutrona and G. Hall, published in I.R.E. Transactions on Military Electronics, April 1962.

In addition to being useful in the field of radar, it is believed the basic concepts of the invention can also be gainfully employed to process many other types of data. For example, communication information signals could be transmitted in phase coded form and decoded or "unscrambled" by scan conversion and filtering by a special matched filter.

While the invention has been particularly shown and described with reference to a preferred embodiment thereof, it will be understood by those skilled in the art that various changes in form and details may be made therein without departing from the spirit and scope of the invention.

What is claimed is:

1. A system for compressing data existing as plural sets of data signals, said signal sets being adapted to have different predetermined frequency versus time characteristics,
    means for converting said data signal sets to respective output signal sets, each of said output signal sets having substantially the same predetermined frequency versus time characteristic, and
    matched filtering means responsive to said output signal sets to provide a compressed output signal in response to each of said output signal sets, said matched filtering means having a frequency versus time response characteristic compatible to the frequency versus time characteristic of said output signal sets.

2. A system for compressing data according to claim 1 wherein said matched filtering means comprises
    a plurality of filters, each of said filters having a frequency response associated with a predetermined frequency component of said output signal set, and an associated delay means operatively related to said filters for providing time coincidence of the different filtered frequency components.

3. A compression system as in claim 1, in which the conversion means includes a storage means for receiving and storing the sets of data signals on a real-time basis, and selectively variable read-out means for reading-out the stored data at such rate as to make it compatible with the matched filtering means.

4. A compression system for processing sets of data, each set being composed of a plurality of different frequency components arranged in a constant unique time slope for the associated set, comprising:
    matched filtering means for passing a given single set of data therethrough and forming a single pulse representative of the given set; and
    conversion means interposed between the sets of data and the matched filtering means for converting the different sets to a form which can be passed through the matched filtering means whereby a pulse is obtained for each set with the degree of conversion required serving to indicate its unique associated time slope,
    said conversion means having a storage means for receiving and storing the sets of data on a real-time basis and wherein said storage means comprises:
        a strip of transparent material provided with a photosensitive material on a surface,
        means for selectively exposing the material in a pattern that accords with the sets of data, and developing means for forming a relatively fixed pattern on the strip of variable light transmissivity representative of the sets of data; and
    a selectively variable read-out means for reading-out the stored data at such rate as to make it compatible with the matched filtering means and wherein said read-out means comprises means for directing a beam of light through the developed strip while scanning the strip at a rate functionally related to a predetermined operational parameter, and signal generating means responsive to the transmitted light beam for providing signals in a form compatible with the matched filtering means.

5. In electromagnetic range detection apparatus, a system for compressing radar returns existing as plural sets of Doppler frequency shift signals, each of said sets being associated with a mutually exclusive target, said Doppler shift signal sets having different predetermined frequency versus time characteristics for different target ranges, the frequency versus time characteristics of the sets associated with targets at the same range being substantially equal, said system comprising
    means for storing coded representations of said Doppler frequency shift signals in such manner that storage location for each target relative to a reference is representative of range to the associated target,
    conversion read-out means for reading-out the stored coded representations at such individual rates to provide respective output signal sets having a common frequency versus time characteristic,
    compressing means for receiving the read-out output signal sets and generating a single identification electric signal for each of the output signal sets, said identification signal representing the target and range thereof associated with the Doppler shift signal set and corresponding output signal set, and
    display means for indicating both the target and their respective ranges.

6. Apparatus as in claim 5, in which the storing means includes a striplike storage medium which has a fundamental physical characteristic thereof modified in a coded manner corresponding to the representations to be stored, the storage being effected on a real-time basis.

7. Apparatus as in claim 5, in which the conversion read-out means converts the stored representations into output sets of electric signals having said common time versus frequency characteristic, each set corresponding to a target, said sets of electric signals being impressed on a carrier to modulate the same, the modulated carrier being applied to the compressing means.

8. Apparatus as in claim 5, in which the compressing means comprises a matched filtering system having a frequency versus time response characteristic compatible to said common frequency versus time characteristic of said output signal sets.

9. In electromagnetic range detection apparatus, a system for compressing radar returns existing as plural sets of Doppler frequency shift signals, each of said sets being associated with a mutually exclusive target, said Doppler shift signal sets having different predetermined frequency versus time characteristics for different target ranges, the frequency versus time characteristics of the sets associated with targets at the same range being substantially equal, said system comprising means for converting said Doppler frequency signal sets to respective output signal sets, each of said output signal sets having substantially the same common predetermined frequency versus time characteristic, and matched filtering means responsive to said output signal sets to provide a compressed output signal in response to each of said output signal sets, said matched filtering means having a frequency versus time response characteristic compatible to the frequency versus time characteristic of said output signal sets.

References Cited by the Examiner
UNITED STATES PATENTS

| | | | |
|---|---|---|---|
| 2,121,868 | 2/1964 | Hausz et al. | 343—5 |
| 3,156,914 | 11/1964 | Welti | 343—17.2 |
| 3,176,296 | 3/1965 | Adams | 343—17.2 |
| 3,178,711 | 4/1965 | Case | 343—13 |

CHESTER L. JUSTUS, *Primary Examiner.*

R. E. KLEIN, P. M. HINDERSTEIN,
                         *Assistant Examiners.*